A. A. ICENHOUR.
GLASS PLATE MANUFACTURE.
APPLICATION FILED APR. 17, 1919.

1,407,036.

Patented Feb. 21, 1922.

A. A. ICENHOUR.
GLASS PLATE MANUFACTURE.
APPLICATION FILED APR. 17, 1919.

1,407,036.

Patented Feb. 21, 1922.
6 SHEETS—SHEET 3.

Fig.4.

Witness
F. C. Gilson.

Inventor
Albert A. Icenhour
By Davis & Davis
Attorneys

A. A. ICENHOUR.
GLASS PLATE MANUFACTURE.
APPLICATION FILED APR. 17, 1919.

1,407,036.

Patented Feb. 21, 1922.
6 SHEETS—SHEET 4.

A. A. ICENHOUR.
GLASS PLATE MANUFACTURE.
APPLICATION FILED APR. 17, 1919.

1,407,036.

Patented Feb. 21, 1922.
6 SHEETS—SHEET 5.

UNITED STATES PATENT OFFICE.

ALBERT A. ICENHOUR, OF ARLINGTON, VIRGINIA, ASSIGNOR TO VIRGINIA PLATE GLASS CORPORATION, OF ARLINGTON, VIRGINIA, A CORPORATION OF VIRGINIA.

GLASS-PLATE MANUFACTURE.

1,407,036.  Specification of Letters Patent.  Patented Feb. 21, 1922.

Application filed April 17, 1919. Serial No. 290,680.

*To all whom it may concern:*

Be it known that I, ALBERT A. ICENHOUR, a citizen of the United States of America, and a resident of Arlington, county of Alexandria, and State of Virginia, have invented certain new and useful Improvements in Glass-Plate Manufacture, of which the following is a full and clear specification.

This invention has relation to that class of methods in which the plate is drawn upwardly out of a molten mass of glass by means of a bait dipped into the glass and then slowly elevated; and the object of this invention, generally speaking, is to so improve this method as to reduce wastage from flaws and breakage to a minimum and to produce a sheet of glass ready for the market without further treatment other than the usual trimming and cutting up into sections, as more fully hereinafter set forth.

In the drawings, A designates the melting-furnace which may be heated to glass-melting temperature in any suitable manner, preferably by means of a gas-burner system B, said furnace being provided along its opposite sides with doors C. On the floor D of the furnace is adapted to be placed a plurality of crucibles E which may be placed in the furnace and removed therefrom through doors C, each of these crucibles being of sufficient capacity to receive enough glass for a single drawing operation.

These crucibles may be placed on the furnace-floor in any suitable arrangement convenient for withdrawing them through the doors C, and preferably, as shown, the furnace is provided with doors along both sides, so that the operation of inserting the crucibles and withdrawing them from the furnace may take place from both sides thereof simultaneously, so that the one furnace may be used for two drawing plants, one at either side of the furnace. In my drawings, I have shown but one of these drawing plants.

The crucibles or pots E are handled by means of a forked-arm F which is supported on a car G adapted to run on rails arranged parallel to the sides of the furnace. This car may be propelled along the rails in any suitable manner, preferably electrically. This car carries mechanism for moving the arm F into and out of the furnace and swinging it around to a substantially horizontal position to enable the crucibles to be withdrawn one at a time from the melting-furnace and swung around in order that they may be inserted into any one of a series of smaller furnaces H arranged in a row substantially parallel to the main furnace and the tracks on which the car G runs. Each of these furnaces is provided with a door I at a convenient point to enable the transfer-arm to insert the crucible into the furnace in a convenient way. Each of these smaller furnaces H is heated by suitable gas-burners J, the temperature being maintained at a suitable glass-drawing degree, approximately 1050 F.

The arm F is mounted to slide on rollers $a$ journaled in a sleeve $b$, which sleeve is pivoted at its forward end on the shaft $c$ of the front pair of rollers $a$. A transverse shaft $d$ mounted in the sleeve carries a gear $e$ which meshes with a rack $f$ formed on the bottom edge of the transfer-arm F, and this gear $e$ is driven from a worm $g$ whose shaft $h$ extends centrally up through the car-platform. A bevel-gear $i$ on the lower end of the shaft $h$ meshes with a bevel-gear $j$ loosely mounted on a shaft $k$, which shaft is driven by gearing $l$ connecting the shaft to a suitable electric motor $m$. A movable clutch-member $n$ enables the shaft $k$ to be connected to and disconnected from the gearing $j$—$h$, so that the motor $m$ may be utilized to run the transfer-arm F back and forth on the rollers $a$ through the medium of the worm $g$, the motor being reversible.

The sleeve $b$ is mounted on a turn-table $o$ which is adapted to be rotated from the shaft $k$ by means of bevel-gears $p$ and $q$, the bevel-gear $q$ being affixed to a hollow shaft $r$ which surrounds the shaft $h$, and at its lower end is affixed to the turn-table. A suitable clutch $s$ enables the turn-table-driving gears $p$ and $q$ to be connected up or disconnected from the driving shaft $k$. The car may be propelled in any suitable manner from the motor $m$; I have shown the shaft $k$ as worm-geared to one of the axles with a clutch $t$ for connecting and disconnecting the worm-gearing to the motor-driven shaft $k$.

With the mechanism above described, it will be observed that the car may be run back and forth alongside the furnace, and the transfer-arm may be inserted in any one of the doors of the furnace to enable its forked-end to be placed under the lateral lugs $u$ on the crucibles to thus lift and withdraw the crucibles from the furnace, whereupon the transfer-arm may be swung around by reason of its turn-table support to bring the transfer-arm into proper position for inserting the crucible into one of the drawing-furnaces H. In thus transferring a crucible from the melting-furnace to a drawing-furnace, as well as in re-inserting a re-charged crucible into the melting-furnace after the drawing operation, it is necessary that the transfer-arm shall be vertically tilted a slight distance; to thus tilt this transfer-arm, I may employ a hand-operated lever $v$ connected by an arm $w$ with link $x$, which latter is pivotally connected to the turn-table, so that by swinging the hand-lever $v$ back and forth the sleeve $b$, together with the transfer-arm, will be vertically tilted on the pivotal point $c$. This tilting action will be very slight at the point where gear $e$ meshes with the worm $g$, and there will be sufficient lost-motion between these gears to permit the desired degree of tilting.

As stated, the temperature of the furnace A is as usual maintained at a high point, say about 3700 F. the smaller, drawing-furnaces H are maintained at glass-drawing temperature, which ordinarily will be about 1050 F. Adjacent each of the smaller furnaces H is a sheet-drawing mechanism which embodies a pair of vertical tracks 1 supported on bolts 2, which in turn are supported on brackets 3, the bolts being threaded and provided with suitable nuts 4 for the purpose of securing a nice adjustment of the tracks 1 with reference to each other. On the tracks runs a carriage 5 which is adapted to be raised and lowered through the medium of a cable 6 by means of any suitable mechanism (not shown), the cable being governed as to speed and time. Upon the carriage is mounted a vertical rod 7 which at its lower end carries a horizontal bait-bar 8 whose length is substantially equal to the width of the glass-sheet to be drawn. By lowering the carriage 5, the bait-bar 8 may be dipped into the molten glass in the crucible far enough to cause the glass to adhere to the lower edge of the bait-bar; then, by slowly raising the carriage with the bait-bar, the glass will be drawn out of the crucible in the form of a sheet 9. When the sheet of glass is completely drawn, it will, of course, be in vertical position parallel with the tracks 1. To take down the drawn sheet of glass, I provide a frame consisting of a pair of side bars 10 whose lower ends are pivotally connected to standards 11 mounted alongside of the adjacent furnace H. This frame is provided with a multiplicity of transverse bars 12 supported on springs 13 and provided on their upper faces with cushions 14 of felt or other material. At the extreme upper end of the take-down frame, there is provided a fork 15 which, when the frame is swung upwardly, will engage under a collar 16 carried by the bait-rod 7, the bait-rod being supported movably in the carriage 5 by means of a collar 17 which rests upon a fork 18 affixed to the carriage. When the fork 15 is swung under the collar 16 and the carriage is slightly lowered, the collar 16 will rest upon said fork 15 and thus arrest the downward movement of the bait-rod, while the carriage will continue to move a short distance until its fork 18 is released from the collar 17, whereupon the bait-rod will rest entirely upon the fork 15 of the take-down frame, so that by swinging the take-down frame outwardly, away from the carriage 5, the bait-rod will be moved out of engagement with the fork 18; then, as the take-down frame reaches a vertical position, the newly drawn plate will settle against the spring-supported bars 12, the plate having first been severed at its lower end from the part which remains attached to the crucible. Then the plate may be brought to a horizontal position by continuing to swing the take-down frame outwardly. In this way, the finished plate may be safely brought down to a position where it will be convenient for cutting up into the desired lengths. After the completed sheet is thus removed from the carriage, a fresh bait-rod may be placed in the carriage and thus the apparatus will be ready for another drawing operation, which may take place during the time the removed sheet is being cut up and disposed of.

Figure 13:
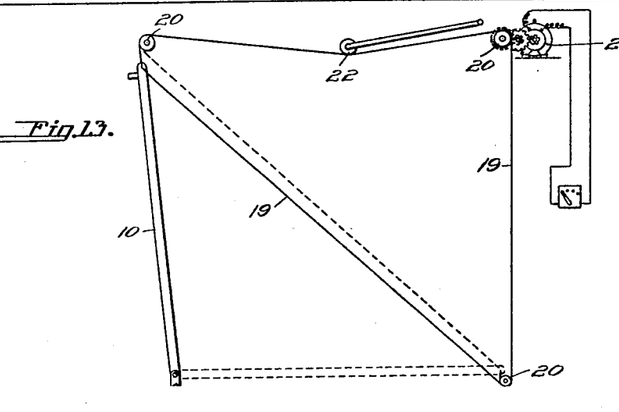
Fig. 13 is a diagram of one form of device for raising and lowering the take-down frame.

The take-down frame may be raised and lowered by any suitable mechanism. I prefer to employ, as shown in Fig. 13, an endless cable or chain 19 connected to the upper end of the take-down frame and arranged to run upon a series of three pulleys 20, one of which may be driven in any suitable manner by means of a motor 21. A belt-tightener 22 may be employed to keep the proper degree of tautness on the cable 19 for raising and lowering the take-down frame.

A feature of my method lies in the fact that I melt the glass in separate batches, each of which is sufficient for one drawing operation, i. e., an operation producing a sheet of the desired length and thickness, sufficient glass being always used to permit a comparatively small quantity to remain in the crucible after each drawing operation, it being practically impossible to obtain a perfect sheet of glass and yet withdraw the entire contents of the crucible. By thus separately melting and separately drawing each batch of glass, I avoid a serious drawback to prior plate-glass drawing processes in which a plate is drawn from a large molten mass in a melting-furnace. In such prior methods, it is impossible to avoid agitating or stirring the glass after it is melted, and this agitation of the melted glass inevitably causes flaws to appear in the drawn plate. I have found out from long experience that any stirring of the molten mass prior to the drawing operation inevitably appears in the form of streaks or lines in the completed plate and this notwithstanding the fact that the molten mass is maintained as nearly as possible at melting temperature. These flaws might not appear in the product if it were possible to maintain the temperature of the melting-furnace at the surface of the mass at the highest degree of melting temperature during the stirring of the mass, but this is practically impossible in view of the fact that when the agitation or stirring of the surface of the glass occurs, it is inevitable that the furnace-door or doors will be open for the purpose of manipulating the devices or tools which cause the stirring of the mass. These devices or tools are not inserted for the special purpose of stirring the glass, but in every process I am aware of it is necessary from time to time to go through some manipulation which requires that the furnace-door shall be opened and the mass shall be more or less agitated on its surface; and it is this agitation of the mass during the slight cooling which takes place by reason of the opening of the door that causes the lines and streaks I have referred to. With my method of separately melting each batch and removing it to a separate drawing-furnace without agitation, I always have a melted mass which is in ideal condition for drawing a perfect plate, i. e., a plate without lines, streaks, waves, spots, etc. I remove each crucible from the melting-furnace prior to the drawing operation, not only because the heat in the melting-furnace is too great to permit the drawing of the glass, but also because of the impossibility of properly manipulating the drawing mechanism over the top of the melting-furnace, where a very high degree of heat is inevitable.

Another advantage in thus segregating each batch is that the formula may be readily changed from time to time as the resultant product may indicate the necessity for changes. In prior methods, it was not feasible to change the formula during the run-off, as it would require too much time and labor in mixing and fusing the additional ingredients, and, besides, it would be virtually impossible to obtain thorough fusion of such additional ingredients. With my new method, in accordance with which newly-filled crucibles are being constantly supplied to the melting-furnace to take the place of the crucibles that are removed to the drawing apparatus, it will be seen that it will be a simple matter to change the formula of the batches at any time during the run. It will be observed that this is a very great advantage in view of the fact that in prior, bulk-drawing processes, it was necessary to draw the entire contents of the furnace before a change of formula could be practically made.

It will be understood that by the time the crucible is removed from the melting-furnace and accurately positioned in the drawing-oven or furnace, the surface of the molten glass in the crucible will have cooled down to drawing temperature, which is approximately 1050 F. It is the purpose of the burners used in these drawing-furnaces to maintain this drawing temperature during the entire drawing process, which is accomplished slowly, the thicker the sheet desired, the slower the drawing operation. This maintaining of the molten batch of proper drawing temperature is assisted by extending the wall of the drawing-oven to a point considerably higher than the top of the crucible, so as to thereby surround the end of the plate during the formative period, thus maintaining the elasticity of the metal until it assumes the desired thickness and smoothness of surface, whereby I am enabled to produce a sheet of glass of accurate and uniform thickness and having a final finish, so that no further treatment of the sheet is required to put it in condition for immediate marketing. The open top of the drawing-oven or furnace, together with the extension of the walls, serves the further purpose of directing and maintaining a vertical column of heat which in its upward passage surrounds the drawn plate and prevents the same being warped, checked or cracked by sudden changes of temperature; in other words, this vertical column of highly heated air and gaseous products forms a protective medium for the plate, this heated column diminishing in temperature toward the upper end of the plate, so that the reduction in temperature of the plate is brought about gradually and with substantial uniformity.

The bait-bar 8 is tapered and rounded along its lower edge, where it dips into the metal. In practice, I heat this bait-bar to a cherry-red, which is approximately drawing temperature. At this temperature, I find that the molten glass adheres tenaciously to the bait throughout the length of the bait-bar, so that a straight even pull is exerted on the sheet throughout the drawing process. It is intended that in practice a number of the bait-bars will be kept heated at the proper temperature, so that a fresh bait may be quickly mounted on the carriage after the finished plate is taken down with the previously-used bait attached thereto. In this way, I avoid the delay that would occur should I use a single bait for each drawing apparatus and therefore be compelled to not only remove the hardened glass adhering to the bait after disconnection from the finished sheet, but also to heat up the bait again to drawing temperature. It will be observed that by nicely positioning the crucible below the drawing apparatus and by nicely adjusting the guide-rails 1, I can maintain great accuracy in the drawing operation, so as to thereby greatly promote uniformity in plate as well as avoid loss by fracture and twisting of the plate.

Figure 1:
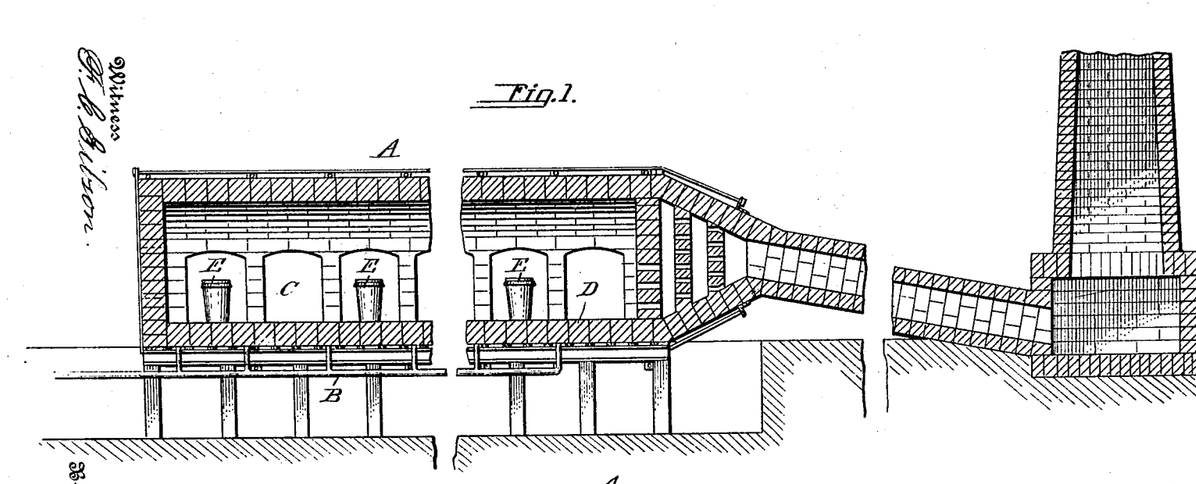
Fig. 1 is a vertical sectional view of the melting-furnace.
Figure 2:
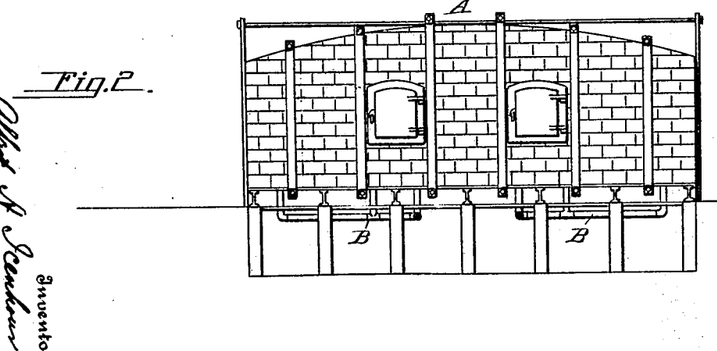
Fig. 2 is a front view thereof.
Figure 3:
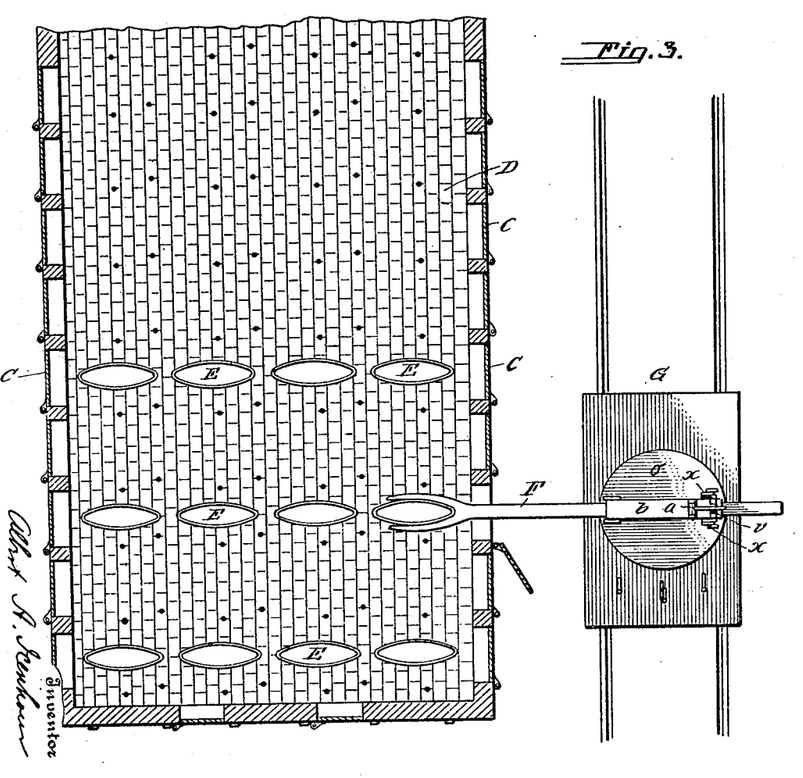
Fig. 3 is a view partly in plan and partly in horizontal section of a plant for carrying out my method.
Figure 4:
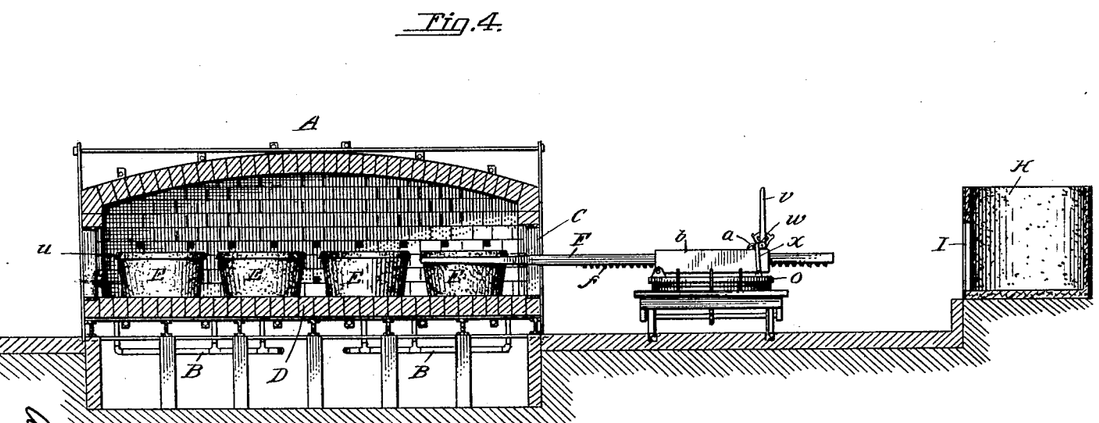
Fig. 4 is a vertical sectional view of the plant.
Figure 5:
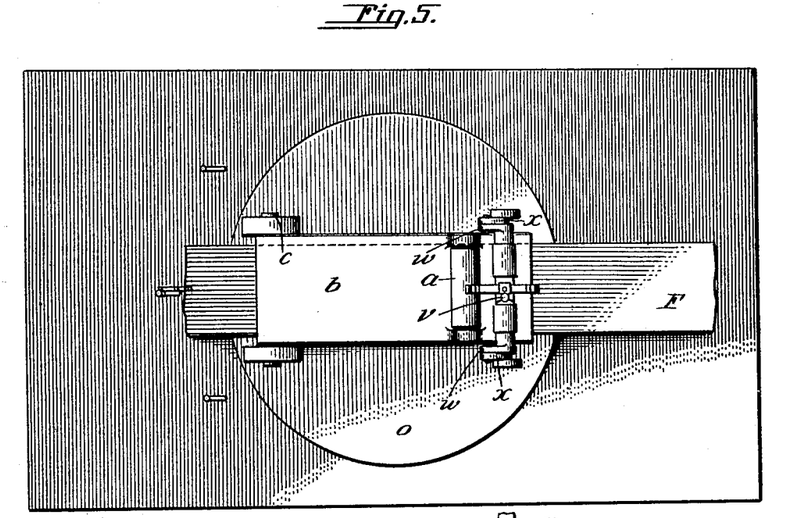
Fig. 5 is a plan view of the turn-table truck or car employed in connection with the transferring mechanism.
Figure 6:
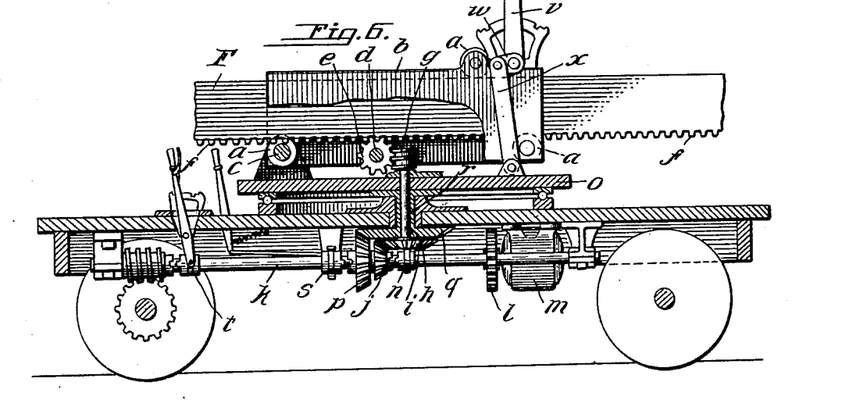
Fig. 6 is a vertical sectional view of said car.
Figure 7:
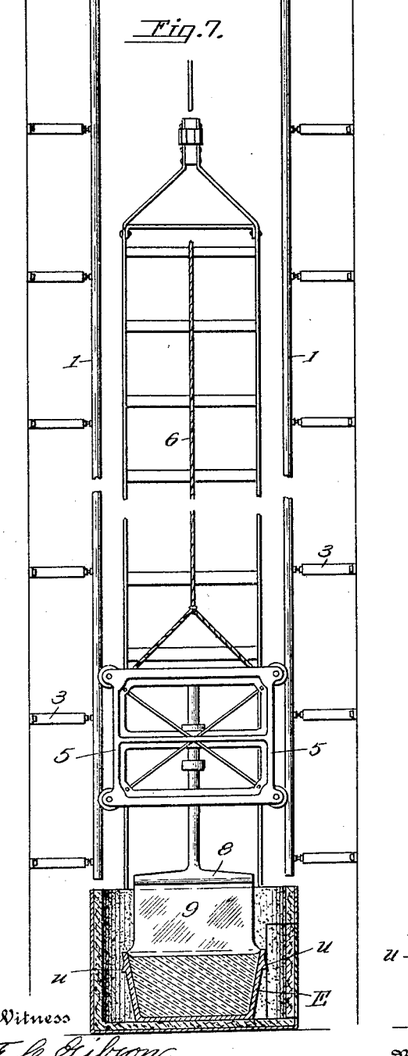
Fig. 7 is a view partly in vertical section and partly in side elevation showing the drawing mechanism in operation.
Figures 8, 9, 10:
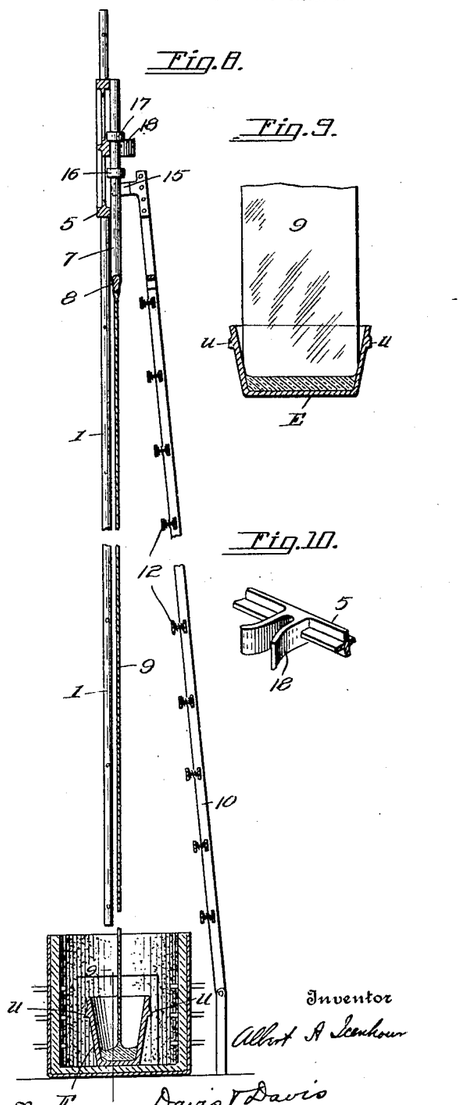
Fig. 8 is a vertical sectional view of the same showing a completely-drawn glass-sheet, with the take-down frame in position to receive the finished plate.
Figs. 9 and 10 are detail views hereinafter described.
Figures 11, 14, 15, 16:
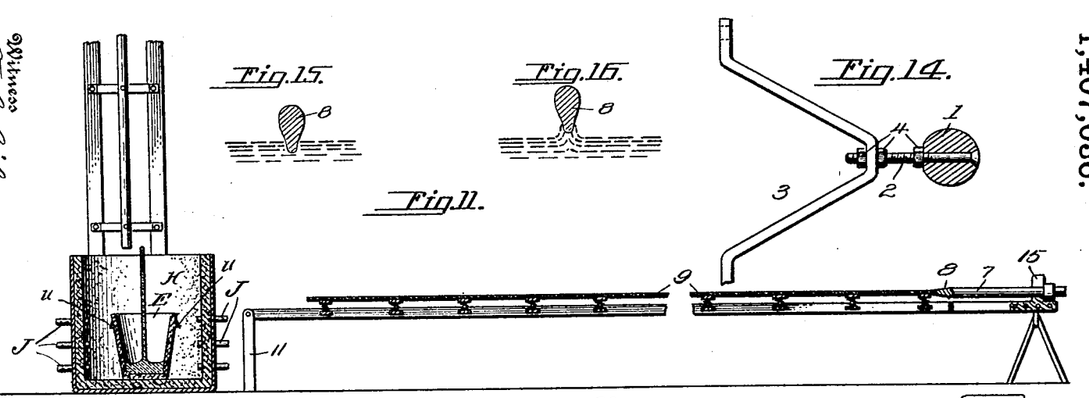
Fig. 11 is a view similar to Fig. 8 showing the take-down frame lowered with the finished sheet of glass.
Fig. 14 is a detail horizontal sectional view of one of the tracks for guiding the bait-carriage.
Figs. 15 and 16 are detail views showing the operation of the bait.
Figure 12:
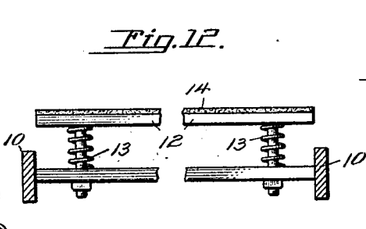
Fig. 12 is a detail vertical sectional view taken through the take-down frame.

A feature of importance in my method and apparatus is not only that the crucible shall be approximately oval in horizontal section, i. e., flattened, but also that the major diameter of the crucible shall be approximately equal to the width of the plate to be drawn, it being my intention to employ a plurality of sizes of crucibles having different capacities, so as to be able to select a set of crucibles for the particular kind and size of plate to be drawn, a series of bait-bars being also provided to enable the proper length of bait-bar to be employed for each type or size of crucible. By employing a bait-bar approximately equal to the diameter of the crucible, I ensure the adhesion of the edges of the sheet, while same is in process of formation, to the interior of the crucible, these points of adhesion traveling down the wall at opposite sides of the crucible as the metal is drawn out of the crucible, as shown particularly in Figs. 7 and 9, Fig. 7 showing the start of the operation and Fig. 9 showing the level of the glass at the point of adhesion of the plate-edges to the crucible about at the end of the drawing operation, it being desirable, and possibly necessary, to leave a small quantity of glass in the bottom of the crucible. By thus maintaining adhesion between the edges of the forming plate and the walls of the crucible and employing a crucible approximately of a diameter equal to that of the sheet, it will be seen that I prevent the tension put upon the sheet during the drawing process from pulling in the edges of the sheet, thereby maintaining the width of the sheet throughout the entire operation. I prefer tapering the crucible upwardly, its diameter at its upper edge being slightly greater than the width of the sheet, so that during the downward travel of the adhering edges of the sheet all tendency to narrow the sheet will be avoided, it being desirable that the diameter of the crucible at the point where the drawing operation ceases, i. e., at a point near the bottom of the crucible, shall be exactly the diameter of the finished sheet. As the adhering edges of the sheet move down the wall of the crucible, the main parts of the edges pull away from the upper portions of the wall, as shown in Fig. 9, although in practice I find that saw-tooth-like films remain in the angle between the edges and the crucible wall. These film-like connections do not affect the accuracy of width of the sheet, since they are not strong enough to destroy the sheet and since they disappear by coalescence into the edges of the sheet as the sheet ascends.

By employing a crucible of substantially oval shape, the converged wall at each end of the crucible forms a sort of guide which ensures the adhering edge of the plate traveling down the walls of the crucible in a straight line, thereby avoiding twisting of the plate (during the formation thereof) at its point of connection with the molten mass. In other words, the converging wall of the crucible at each end thereof forms a vertical groove or channel down which the adhering edge is compelled to travel, since it is the easiest path for it to travel; and, besides, the convergence of the wall makes this vertical line of the mass of metal the coolest part of the mass, thereby ensuring not only an effective adherence of the edge of the sheet to the crucible but also a proper forming of the edge portion of the sheet. In other words, the oval shape of the crucible ensures an ideal condition of the metal, in that it is hottest at the center of the sheet and coolest at the edges, thereby not only ensuring adherence of the edges to the crucible wall, but also ensuring the proper degree of plasticity at the points where the edges of the sheet are forming.

The nature and scope of the invention having been thus indicated and its preferred embodiment having been specifically described, what is claimed as new is:

1. In a glass-drawing apparatus, a bait-bar and means for raising and lowering it, and a crucible for holding the metal, the major diameter of this crucible being approximately the length of the bait-bar and being oval in horizontal section, with its major diameter parallel to the bait-bar.

2. In a process of making sheet-glass, drawing the sheet from a molten mass of glass in a container approximately the width of the sheet so that the edges of the sheet at the points of formation of the sheet travel down the interior of the wall of the container during the drawing operation, the container being tapered at opposite sides to cause the adhering edges of the plate to travel in vertical lines down the vertical channels formed by the tapering of the walls of the container.

3. In a process of making sheet-glass, drawing the sheet from a molten mass of glass in a container whose major diameter is approximately the width of the sheet so that the edges of the sheet at the points of formation travel down the interior of the wall of the container during the drawing operation, the container being tapered at opposite sides to cause the adhering edges of the plate to travel in vertical lines down the vertical channels formed by the converging of the walls of the container, the container being also tapered upwardly to a width slightly greater at its major diameter than the length of the bait to thereby avoid narrowing the sheet during the initial part of the drawing operation.

4. In plate-glass manufacture, melting the cullet in a pot adapted to contain only sufficient glass for a single drawing operation, and then drawing the sheet directly upwardly from said pot by a bait, said pot being substantially oval in horizontal section and the bait being not only in alinement with the major diameter of the pot but also of approximately the same length thereof, so that the edges of the plate at the points of formation will travel in vertical lines down the vertical channels formed by the converging sides of the pot.

In testimony whereof I hereunto affix my signature.

ALBERT A. ICENHOUR.